United States Patent
Sun et al.

(10) Patent No.: US 11,435,265 B2
(45) Date of Patent: Sep. 6, 2022

(54) METHOD FOR ESTIMATING STATE OF COMBINED HEAT AND POWER SYSTEM

(71) Applicant: Tsinghua University, Beijing (CN)

(72) Inventors: Hongbin Sun, Beijing (CN); Qinglai Guo, Beijing (CN); Bin Wang, Beijing (CN); Tongtian Sheng, Beijing (CN); Boming Zhang, Beijing (CN); Wenchuan Wu, Beijing (CN); Mingye Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 409 days.

(21) Appl. No.: 16/841,481

(22) Filed: Apr. 6, 2020

(65) Prior Publication Data
US 2020/0232886 A1 Jul. 23, 2020

Related U.S. Application Data

(63) Continuation of application No. PCT/CN2017/114464, filed on Dec. 4, 2017.

(30) Foreign Application Priority Data

Oct. 9, 2017 (CN) .......................... 201710927795.4

(51) Int. Cl.
*G01M 99/00* (2011.01)
*G06F 1/28* (2006.01)
*G06F 17/13* (2006.01)

(52) U.S. Cl.
CPC ............. *G01M 99/005* (2013.01); *G06F 1/28* (2013.01); *G06F 17/13* (2013.01)

(58) Field of Classification Search
CPC ........ G01M 99/005; G06F 1/28; G06F 17/13; Y02P 80/15; Y04S 10/50; G06Q 50/06; G06Q 10/06
See application file for complete search history.

(56) References Cited

PUBLICATIONS

WIPO, ISR for PCT/CN2017/114464 Jul. 10, 2018.

*Primary Examiner* — Tejal Gami
(74) *Attorney, Agent, or Firm* — Hodgson Russ LLP

(57) ABSTRACT

A method for estimating a state of a combined heat and power system is provided. The method include: establishing an objective function; establishing constraints under a steady-state operating stage; converting the objective function and the constraints by utilizing a Lagrangian multiplier to obtain a Lagrange function; obtaining a steady-state estimation result of the combined heat and power system based on the Lagrange function; calculating an energy transmission delay produced by each pipe; establishing a dynamic constraint of each pipe based on the steady-state estimation result and the energy transmission delay; converting the objective function, the constraints, and the dynamic constraint by utilizing the Lagrangian multiplier to update the Lagrange function; obtaining a dynamic-state estimation result of the combined heat and power system during a dynamic-state operating stage of the combined heat and power system based on the updated Lagrange function.

13 Claims, 2 Drawing Sheets

METHOD FOR ESTIMATING STATE OF COMBINED HEAT AND POWER SYSTEM

CROSS-REFERENCE TO RELATED APPLICATION

This is a continuation of International Application No. PCT/CN2017/114464, filed Dec. 4, 2017, which claims priority to Chinese Patent Application No. 201710927795.4, filed Oct. 9, 2017, the entire disclosures of which are incorporated herein by reference.

FIELD

The present disclosure relates to a method for estimating a state of a combined heat and power system, belongs to the field of operation and control technologies for integrated energy systems.

BACKGROUND

In order to improve the utilization efficiency of various energy sources, enhance the flexibility of making full use of all kinds of energy sources, reduce the carbon emission, and increase the penetration rate of new energy sources, Energy Internet and Integrated Energy System rise in response to the proper time and conditions. The combined heat and power network is currently developing the fastest and has the broadest application prospects.

SUMMARY

The combined heat and power system includes an electricity system and a heating system coupled with each other. The method for estimating the state of the combined heat and power system includes: establishing an objective function for estimating the state of the combined heat and power system, the objective function being denoted by min $J(x)=[z-f(x)]^T W[z-f(x)]$, where z represents a column vector of measurements of the combined heat and power system, x represents a column vector of sate variables of the combined heat and power system, $f(x)$ represents a measurement function for describing relationships among the measurements and the state variables; establishing constraints under a steady-state operating stage of the combined heat and power system, in which the constraints under the steady-state operating stage of the combined heat and power system comprise: power flow constraints of the electricity system, steady-state hydraulic constraints of pipes of the heating system, thermal steady-state constraints of the pipes of the heating system, constraints of cogeneration units of the combined heat and power system; converting the objective function and the constraints under the steady-state operating stage of the combined heat and power system by utilizing a Lagrangian multiplier to obtain a Lagrange function; obtaining a steady-state estimation result of the combined heat and power system during the steady-state operating stage of the combined heat and power system based on the Lagrange function; calculating an energy transmission delay produced by each pipe in the heating system; establishing a dynamic constraint of each pipe in the heating system based on the steady-state estimation result and the energy transmission delay; converting the objective function, the constraints under the steady-state operating stage of the combined heat and power system, and the dynamic constraint of each pipe in the heating system by utilizing the Lagrangian multiplier to update the Lagrange function; obtaining a dynamic-state estimation result of the combined heat and power system during a dynamic-state operating stage of the combined heat and power system based on the updated Lagrange function; determining whether the dynamic-state estimation result is convergent; in response to the dynamic-state estimation result being convergent, using the dynamic-state estimation result as the state of the combined heat and power system; and in response to the dynamic-state estimation result being not convergent, returning the establishing constraints under the steady-state operating stage of the combined heat and power system.

DETAILED DESCRIPTION

The present disclosure proposes a method for estimating a state of a combined heat and power system by considering dynamics characteristics of pipes, which fully considers the dynamic characteristics of the pipes, and the delay effect in the energy transfer caused by the dynamic characteristics of the pipes, and performs the two-stage state estimation method on the combined heat and power system to meet the requirements of real-time and credibility of data in multi-energy flow management systems and real-time scheduling.

Figure 1:
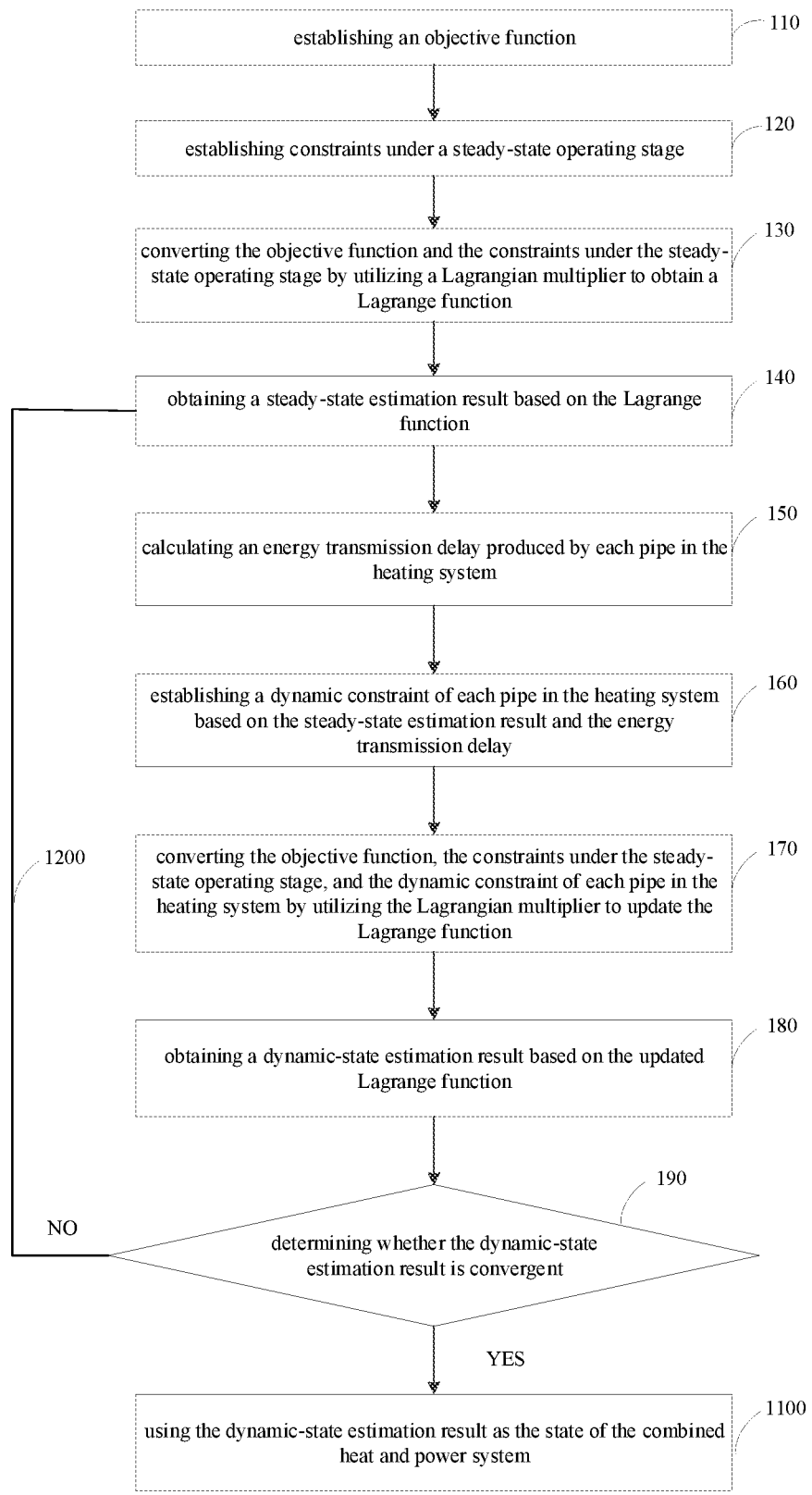
FIG. 1 is a flowchart of a method for estimating a state of a combined heat and power system according to an embodiment of the present disclosure.

As shown in FIG. 1, the method include: establishing (110) an objective function for estimating the state of the combined heat and power system, the objective function being denoted by min $J(x)=[z-f(x)]^T W[z-f(x)]$, where z represents a column vector of measurements of the combined heat and power system, x represents a column vector of sate variables of the combined heat and power system, $f(x)$ represents a measurement function for describing relationships among the measurements and the state variables; establishing (120) constraints under a steady-state operating stage of the combined heat and power system, in which the constraints under the steady-state operating stage of the combined heat and power system comprise: power flow constraints of the electricity system, steady-state hydraulic constraints of pipes of the heating system, thermal steady-state constraints of the pipes of the heating system, constraints of cogeneration units of the combined heat and power system; converting (130) the objective function and the constraints under the steady-state operating stage of the combined heat and power system by utilizing a Lagrangian multiplier to obtain a Lagrange function; obtaining (140) a steady-state estimation result of the combined heat and power system during the steady-state operating stage of the combined heat and power system based on the Lagrange function; calculating (150) an energy transmission delay produced by each pipe in the heating system; establishing (160) a dynamic constraint of each pipe in the heating system based on the steady-state estimation result and the energy transmission delay; converting (170) the objective function, the constraints under the steady-state operating stage of the combined heat and power system, and the dynamic constraint of each pipe in the heating system by utilizing the Lagrangian multiplier to update the Lagrange function; obtaining (180) a dynamic-state estimation result of the combined heat and power system during a dynamic-state operating stage of the combined heat and power system based on the updated Lagrange function; determining (190) whether the dynamic-state estimation result is convergent; in response to the dynamic-state estimation result being convergent, using (1100) the dynamic-state estimation result as the state of the combined heat and power system; and in response to the dynamic-state estimation result being not convergent, returning (1200) the establishing constraints under the steady-state operating stage of the combined heat and power system.

Figure 2:
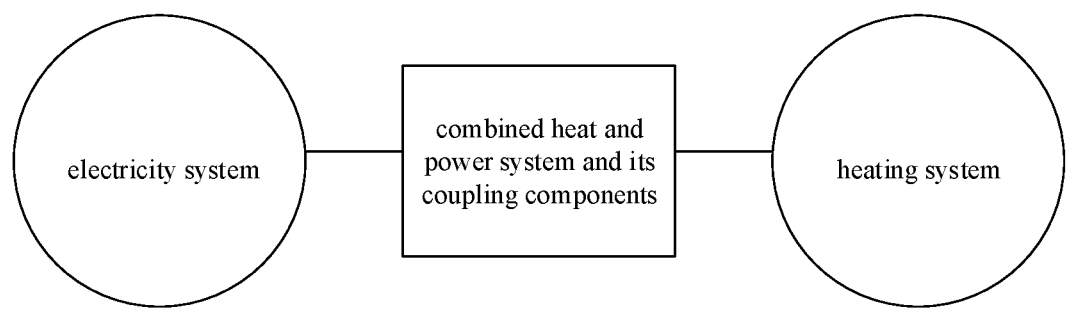
FIG. 2 is a block diagram of a simplified structure of a combined heat and power system according to an embodiment of the present disclosure.

In an embodiment, the method for estimating the state of the combined heat and power system by considering the dynamic characteristics of the pipes, provided by the present disclosure, includes the following steps, in which the related combined heat and power system may be simplified as FIG. 2.

(1) An accuracy δ and a preset maximum cycle index d for estimating the state of the combined heat and power system may be set. A cycle index a is set to 0 during initialization.

(2) Operating parameters of the combined heat and power system at time t may be measured in real time. The operating parameters may include: a voltage amplitude $V_i$, an injection active power $P_i$ and an injection reactive power $Q_i$ of each node i in an electricity system; an active power $P_{ij}$ and a reactive power $Q_{ij}$, transmitted by a transmission line between node i and node j connected to node i in the electricity system; a pressure $h_k$, an injection mass flow rate $L_k$, a supply water temperature $T_{k,in}$, a return water temperature $T_{k,out}$, and a heat power $\Phi_k$ supplied or consumed by a heat source or a heat-load node, of each node k in a heating system; a mass flow rate $m_{kl}$ in a connection pipe between node k and node l connected to node k in the heating system. The above measured values form a column vector z. These operating parameters may be referred as measurements of the combined heat and power system.

All state variables to be estimated in the combined heat and power system form a column vector x. $x=[x_e x_h]^T$, where, $x_e=[V_i \theta_i]^T$, that is, it is a column vector formed by the voltage amplitude $V_i$ and a phase $\theta_i$ of each node i in the electricity system, and $x_h=[h_k T_{k,in} T_{k,out}]^T$, that is, it is a column vector formed by the pressure $h_k$, the temperatures $T_{k,in}$ and $T_{k,out}$ of each node k in the heating system. The voltage amplitude, the pressure and the temperature may be measured. However, the measured voltage amplitude, pressure and temperature may have noise. Therefore, the voltage amplitude, the pressure and the temperature need to be estimated.

A measurement function $f(x)$ is constructed for describing a relationship between the state variables and the measurements in the combined heat and power system. $f(x)=[f_e(x) f_h(x)]^T$, where, a superscript T represents a matrix transpose.

$f_e(x)$, represents a power flow equation of the electricity system, which is denoted by:

$$P_i = V_i \sum_{j \in i} V_j (G_{ij} \cos\theta_{ij} + B_{ij} \sin\theta_{ij})$$

$$Q_i = V_i \sum_{j \in i} V_j (G_{ij} \sin\theta_{ij} - B_{ij} \cos\theta_{ij})$$

$$P_{ij} = -V_i^2 G_{ij} + V_i V_j (G_{ij} \cos\theta_{ij} + B_{ij} \sin\theta_{ij})$$

$$Q_{ij} = V_i^2 (B_{ij} - b_c) + V_i V_j (G_{ij} \sin\theta_{ij} - B_{ij} \cos\theta_{ij})$$

$$V_i = V_i$$

where, $\theta_{ij}$ represents a phase difference between node i and node j, that is, $\theta_{ij}=\theta_i-\theta_j$, $\theta_j$ represents a phase of node j; $G_{ij}$ represents a real part of an element at $i^{th}$ cow and $j^{th}$ column in a node admittance matrix Y of the electricity system, $B_{ij}$ represents an imaginary part of the element at $i^{th}$ cow and $j^{th}$ column in the node admittance matrix Y of the electricity system; $b_c$ represents an equivalent susceptance to ground of a grid branch. The above data is obtained from a dispatch center of the electricity system.

$f_h(x)$, represents a power flow equation of the heating system, which is denoted by:

$$L_k = \sum_{<k,l> \in Pipe_k} \frac{1}{\sqrt{K_{kl}}} \cdot \frac{h_l - h_k}{|h_l - h_k|}$$

$$m_{kl} = \frac{1}{\sqrt{K_{kl}}} \cdot \frac{h_k - h_l}{|h_k - h_l|}$$

$$\Phi_k = C_p L_k (T_{k,in} - T_{k,out})$$

$$T_{k,in} = T_{k,in}$$

$$T_{k,out} = T_{k,out}$$

$$h_k = h_k$$

where, $h_l$ represents a pressure of node l in the heating system, $K_{kl}$ represents a pipe resistance coefficient, which may be selected from 10~500 Pa/(kg/second)$^2$; $C_p$ represents a specific heat at constant pressure of the fluid (usually water) in the pipe, which is obtained from a physical parameter table of the fluid.

(3) Based on the measurements of step (2), an objective function of estimating the state of the combined heat and power system may be established, which is denoted as follows:

$$\min J(x) = [z - f(x)]^T W [z - f(x)]$$

where, W represents a covariance matrix of the measurements, and superscript T represents the matrix transpose.

(4) Constraints under a steady-state operating stage of the combined heat and power system may be established. The constraints may include the following.

(4-1) Power flow constraints of the electricity system, which may be denoted by:

$$P_i = V_i \sum_{j \in i} V_j (G_{ij} \cos\theta_{ij} + B_{ij} \sin\theta_{ij})$$

$$Q_i = V_i \sum_{j \in i} V_j (G_{ij} \sin\theta_{ij} - B_{ij} \cos\theta_{ij})$$

where, $\theta_{ij}$ represents a phase difference between node i and node j, that is, $\theta_{ij}=\theta_i-\theta_j$; $G_{ij}$ represents a real part of an element at $i^{th}$ cow and $j^{th}$ column in a node admittance matrix Y of the electricity system, $B_{ij}$ represents an imaginary part of an element at $i^{th}$ cow and $j^{th}$ column in the node admittance matrix Y of the electricity system. The above data is obtained from a dispatch center of the electricity system.

(4-2) Steady-state hydraulic constraints of the pipes of the heating system, which is denoted by:

$$h_{pu} = a_0 \cdot m^2 + a_1 \cdot m + a_2$$

-continued $$h_{pi} = K \cdot m \cdot |m|$$

$$h_{va} = \frac{100}{\rho} \cdot \left(\frac{m}{Kv}\right)^2$$

$$h_{ex} = c \cdot \text{Re}^b \cdot \frac{\zeta}{\rho} \cdot m^2$$

$$A \cdot m = m^q$$

$$B \cdot h = 0$$

where, h represents a pressure provided by an element or a pressure of fluid loss when the fluid flows through the element; m represents a mass flow rate of the fluid flowing through the element; the subscript represents a type of element, in which, pu represents a circulating pump, pi represents a pipe, va represents a valve, ex represents a heat exchanger; $a_0$, $a_1$, $a_2$ represent parameters of the circulation pump, which are obtained from a product nameplate or a factory hydraulic test report of the circulation pump; K represents a resistance along the pipe of the heating system; Kv represents a parameter of the valve, which is determined by a valve nameplate; Re represents a Reynolds number; $\rho$ represents a density of the fluid in the pipe of the heating system; b, c, $\zeta$ represent parameters of the heat exchanger, which are obtained from a product nameplate or a factory hydraulic test report of the heat exchanger; A represents a node-branch correlation matrix of the heating system; m represents a column vector including a mass flow rate of each branch in the heating system, and $m^q$ represents a column vector including an injection mass flow rate at each node in the heating system; B represents a loop-branch correlation matrix of the heating system; and h represents a column vector including a pressure difference at each node.

In the six formulas of the steady-state hydraulic constraints of the pipes of the heating system, the first four formulas represent pressure changes caused by the fluid flowing through the components (circulating pumps, pipes, valves and heat exchangers) in the heating system. The latter two formulas describe the topological constraints of the heating network.

(4-3) Thermal steady-state constraints of the pipes of the heating system, which may be denoted by:

$$(\Sigma m_{out})T_{out} = \Sigma(m_{in}T_{in})$$

$$\varphi_{ex,h} = C_p \cdot m_h \cdot (T_{h,in} - T_{h,out})$$

$$\varphi_{ex,c} = C_p \cdot m_c \cdot (T_{c,in} - T_{c,out})$$

$$\varphi_{ex,h} = \varphi_{ex,c}$$

where, m represents a mass flow rate of the fluid flowing through the element; subscript ex represents the heat exchanger; $\varphi$ represents an internal energy power; T represents a fluid temperature; subscript out represents an outflow node; subscript in represents an inflow node; subscript h represents a hot-water side of the heat exchanger; subscript c represents a cold-water side of the heat exchanger; $C_p$ represents a specific heat at constant pressure of the fluid in the pipe of the heating system, which is obtained from a physical parameter table of the fluid.

(4-4) Constraints of cogeneration units under a case that the combined heat and power system employs gas turbines or reciprocating piston internal combustion engines as the cogeneration units, which may be denoted by:

$$k_{CHP} = \Phi^{CHP}/P^{CHP}$$

where, $k_{CHP}$ represents a heat and power generation ratio of the cogeneration unit, which is obtained from product specifications of the gas turbine or the reciprocating piston internal combustion engine; $\Phi^{CHP}$ represents a heat power generated by the cogeneration unit; and $P^{CHP}$ represents an electric power generated by the cogeneration unit.

Constraints of cogeneration units under a case that the combined heat and power system employs steam turbines as the cogeneration units, which may be denoted by:

$$Z_{CHP} = \frac{\Phi^{CHP} - 0}{P^{Con} - P^{CHP}}$$

where, $Z_{CHP}$ represents a ratio that describes the trade-off between heat supplied to site and electric power of the steam turbine; $Z_{CHP}$ is obtained from the product specification of the steam turbine; $P^{Con}$ represents a maximum power output of the steam turbine; $P^{Con}$ is obtained from the product specification of the steam turbine; $\Phi^{CHP}$ represents a heat power produced by the cogeneration unit; $P^{CHP}$ represents an electric power generated by the cogeneration unit, which is obtained from the product specification of the steam turbine.

(5) By utilizing a Lagrangian multiplier method, the objective function of step (3) and the constraints of step (4) may form a Lagrange function as follows:

$$L(x,\omega) = J(x) + \omega^T c(x).$$

The above Lagrangian function is modified to obtain a model for estimating the state of the combined heat and power system during the steady-state operation of the pipe system as follows:

$$\begin{bmatrix} F^T W F & C^T \\ C & 0 \end{bmatrix} \begin{bmatrix} \Delta x \\ \omega \end{bmatrix} = \begin{bmatrix} F^T W \Delta z \\ -\Delta c \end{bmatrix}.$$

Utilizing a Newton-Raphson method in the optimization theory, the model is solved to obtain a state estimation result of the combined heat and power system during the steady-state operation of the pipe system.

(6) Based on dynamic characteristics of the combined heat and power network and the state estimation result of the combined heat and power system during the steady-state operation of the pipe system in step (5), the state of the combined heat and power system during the dynamic operation of the pipe system may be estimated, which may include the following steps.

(6-1) An energy transmission delay produced by each pipe in the heating system may be calculated using the following formula of:

$$s = \gamma \cdot \Delta t - \frac{V^* - SL}{(\hat{m}_{t-\gamma\Delta t}/\rho_{t-\gamma\Delta t})}$$

where, $\hat{m}_{t-\gamma\Delta t}$ represents a fluid mass flow rate in the pipe of the heating system for time $t-\gamma\Delta t$, of which the value obtained in historical steady-state estimation results that are obtained in the step (5); $\rho$ represents a fluid density corresponding to the temperature in the steady-state estimation result of the combined heat and power system during the steady-state operation of the pipe system;

$$\gamma = \min_n \left\{ n : \text{s.t.} \sum_{k=0}^{n} \left( \frac{\hat{m}_{t-k\Delta t}}{\rho_{t-k\Delta t}} \cdot \Delta t \right) \geq SL, \ n \geq 0, \ n \in Z \right\},$$

in which, $$\min_n$$

represents obtaining a minimum value of all eligible n in the system; s. t. represents an abbreviation of subject to, which means subjecting to conditions; $\hat{m}_{t-\Delta t}$ represents a fluid mass flow rate in the pipe of the heating system for time t–kΔt, of which the value obtained from historical steady-state state estimating results when k>0 and from a current steady-state state estimation result in the step (5) when k=0; Z represents a set of integers, that is, the smallest positive integer n is found, such that $$\sum_{k=0}^{n} \left( \frac{\hat{m}_{t-k\Delta t}}{\rho_{t-k\Delta t}} \cdot \Delta t \right) \geq SL$$

is established, and n that satisfies the conditions is assigned to γ; Δt represents a sampling interval on the operation parameters of the combined heat and power system in step (2);

$$V^* = \sum_{k=0}^{\gamma} \left( \frac{\hat{m}_{t-k\Delta t}}{\rho_{t-k\Delta t}} \cdot \Delta t \right);$$

S represents a cross-sectional area of the pipe; and L represents a length of the pipe.

(6-2) The fluid density and the specific heat at constant pressure at the state estimation time may be obtained based on the average fluid temperature in the result. That is:

$$\rho = \rho(\overline{T}), C_p = C_p(\overline{T})$$

where, $\overline{T}$ represents an average temperature of the fluid in a period from time (t–γΔt) to time t.

A dynamic constraint equation of each pipe in the heating system is established as follows:

$$T_{out}(t) = [T_{in}(t - \gamma \Delta t) - T_a] \cdot e^{-\frac{\lambda}{C_p S \rho} \cdot s} + T_a$$

where, $T_{out}(t)$ represents a return water temperature of a pipe at time t; $T_{k,in}(t-\gamma\Delta t)$ represents a supply water temperature of the pipe at time (t–γΔt); $T_a$ represents an ambient temperature of the pipe, which is obtained from a temperature measurement device of the surrounding environment; λ represents a heat dissipation coefficient per unit length of the pipe, which is obtained from a pipe nameplate; S represents a cross-sectional area of the pipe; L represents a length of the pipe; and s represents the energy transmission delay calculated by step (6-1).

(6-3) Taking the steady-state constraints of step (4) as the constraints of the objective function of step (3), together with the dynamic constraint equations of all the pipes of step (6-2), a Lagrange function is formed as follows:

$$L(x,\omega) = J(x) + \omega^T c(x).$$

The Newton-Raphson method is utilized to solve the Lagrange function, and the state estimation result of the combined heat and power system during the dynamic operation of the heating system is obtained.

(7) Convergence judgment is performed on the state estimation result of step (6).

If the cycle index a reaches the preset cycle index d, that is, a≥d, the current state estimation result is used as the state estimation result of the combined heat and power system by considering the dynamic characteristics of the pipes at time t.

If the cycle index a does not reach the preset cycle index d, that is, a<d, the convergence of the state estimation result is further judged according to the accuracy δ for estimating the state of the combined heat and power system. If the difference between the state variables $x_a$ and the state variables $x_{a-1}$ in two recent neighboring estimation results is less than the accuracy δ, that is, $\max|x_a - x_{a-1}| < \delta$, the current state estimation result is taken as the state estimation result of the combined heat and power system by considering the dynamic characteristics of the pipes at time t. If the difference between the state variables $x_a$ and the state variables $x_{a-1}$ in two recent neighboring estimation results is greater than or equal to the accuracy δ, that is, $\max|x_a - x_{a-1}| \geq \delta$, the state variables may be updated, the fluid density and the specific heat at constant pressure may be updated based on the temperature value obtained from the current state estimation, while it make a=a+1; and step (4) is returned to continue the state estimation process.

The method for estimating the state of the combined heat and power system by considering the dynamic characteristics of the pipes, provided by the present disclosure may have the following characteristics and effects.

The method of the present disclosure fully considers the differences of the heating system and the electricity system in the energy transmission speed and time, well integrates the dynamic characteristics of the heating system, and is adapted to the controllability and activity requirements on the thermal power in the energy management system and dispatch management system of the combined heat and power network. When the heating system is controlled by scheduling to change the operating mode, the present disclosure can more accurately track changes in state variables such as system temperature, and has better convergence. The application of this method needs to be based on a large-scale measurement device in the combined heat and power network. At present, the combined heat and power network cannot fully meet the requirements of the present disclosure. Therefore, after successfully applying this method in the combined heat and power network, it can obtain dynamic state estimation solutions provide detailed data support for energy management systems and dispatch management systems.

What is claimed is:

1. A method for estimating a state of a combined heat and power system, wherein the combined heat and power system comprises an electricity system and a heating system coupled with each other, and the method comprises:

establishing an objective function for estimating the state of the combined heat and power system, the objective function being denoted by $\min J(x) = [z - f(x)]^T W[z - f(x)]$, where z represents a column vector of measurements of the combined heat and power system, x represents a column vector of sate variables of the combined heat and power system, $f(x)$ represents a measurement function for describing relationships among the measurements and the state variables, and W represents a covariance matrix of the measurements;

establishing constraints under a steady-state operating stage of the combined heat and power system, in which the constraints under the steady-state operating stage of the combined heat and power system comprise: power flow constraints of the electricity system, steady-state hydraulic constraints of pipes of the heating system, thermal steady-state constraints of the pipes of the heating system, constraints of cogeneration units of the combined heat and power system;

converting the objective function and the constraints under the steady-state operating stage of the combined heat and power system by utilizing a Lagrangian multiplier to obtain a Lagrange function;

obtaining a steady-state estimation result of the combined heat and power system during the steady-state operating stage of the combined heat and power system based on the Lagrange function;

calculating an energy transmission delay produced by each pipe in the heating system;

establishing a dynamic constraint of each pipe in the heating system based on the steady-state estimation result and the energy transmission delay;

converting the objective function, the constraints under the steady-state operating stage of the combined heat and power system, and the dynamic constraint of each pipe in the heating system by utilizing the Lagrangian multiplier to update the Lagrange function;

obtaining a dynamic-state estimation result of the combined heat and power system during a dynamic-state operating stage of the combined heat and power system based on the updated Lagrange function;

determining whether the dynamic-state estimation result is convergent;

in response to the dynamic-state estimation result being convergent, using the dynamic-state estimation result as the state of the combined heat and power system; and in response to the dynamic-state estimation result being not convergent, returning the establishing constraints under the steady-state operating stage of the combined heat and power system.

2. The method of claim 1, wherein, the measurements comprise a voltage amplitude, an injection active power and an injection reactive power of each node in the electricity system, an active power and a reactive power transmitted by each transmission line between nodes in the electricity system, a pressure, a supply water temperature, a return water temperature and a heat power of each node in the heating system, and a mass flow rate in each connection pipe between nodes in the heating system; and the state variables comprise the voltage amplitude and a phase of each node in the electricity system, and the pressure, the supply water temperature, the return water temperature of each node in the heating system.

3. The method of claim 2, wherein the measurements are obtained from a control center of the combined heat and power system.

4. The method of claim 2, wherein, $x=[x_e x_h]^T$, where, $x_e=[V_i \theta_i]^T$, $V_i$ represents a voltage amplitude of node i in the electricity system, and $\theta_i$ represents a phase of node i in the electricity system; $x_h=[h_k T_{k,in} T_{k,out}]^T$, $h_k$ represents a pressure of node k in the heating system, $T_{k,in}$ represents a supply water temperature of node k in the heating system, and $T_{k,out}$ represents a return water temperature of node k in the heating system; superscript T represents a matrix transpose;

$f(x)=[f_e(x) f_h(x)]^T$, where, $f_e(x)$, represents a power flow equation of the electricity system, which is denoted by:

$$P_i = V_i \sum_{j \in i} V_j (G_{ij} \cos\theta_{ij} + B_{ij} \sin\theta_{ij})$$

$$Q_i = V_i \sum_{j \in i} V_j (G_{ij} \sin\theta_{ij} - B_{ij} \cos\theta_{ij})$$

$$P_{ij} = -V_i^2 G_{ij} + V_i V_j (G_{ij} \cos\theta_{ij} + B_{ij} \sin\theta_{ij})$$

$$Q_{ij} = V_i^2 (B_{ij} - b_c) + V_i V_j (G_{ij} \sin\theta_{ij} - B_{ij} \cos\theta_{ij})$$

$$V_i = V_i$$

where, $P_i$ represents an injection active power of node i in the electricity system, $Q_i$ represents an injection reactive power of node i in the electricity system, $P_{ij}$ represents an active power transmitted by a transmission line between node i and node j connected to node i in the electricity system, $Q_{ij}$ represents a reactive power transmitted by the transmission line between node i and node j in the electricity system, $V_j$ represents a voltage amplitude of node j in the electricity system, $\theta_{ij}$ represents a phase difference between node i and node j, $\theta_{ij}=\theta_i-\theta_j$, $\theta_j$ represents a phase of node j, $G_{ij}$ represents a real part of an element at $i^{th}$ cow and $j^{th}$ column in a node admittance matrix Y of the electricity system, $B_{ij}$ represents an imaginary part of the element at $i^{th}$ cow and $j^{th}$ column in the node admittance matrix Y, $b_c$ represents an equivalent susceptance to ground of a grid branch;

$f_h(x)$, represents a power flow equation of the heating system, which is denoted by:

$$L_k = \sum_{<k,l> \in Pipe_k} \frac{1}{\sqrt{K_{kl}}} \cdot \frac{h_l - h_k}{|h_l - h_k|}$$

$$m_{kl} = \frac{1}{\sqrt{K_{kl}}} \cdot \frac{h_k - h_l}{|h_k - h_l|}$$

$$\Phi_k = C_p L_k (T_{k,in} - T_{k,out})$$

$$T_{k,in} = T_{k,in}$$

$$T_{k,out} = T_{k,out}$$

$$h_k = h_k$$

where, $h_k$ represents a pressure of node k in the heating system, $h_l$ represents a pressure of node l in the heating system, $K_{kl}$ represents a pipe resistance coefficient, $m_{kl}$ represents a mass flow rate in a connection pipe between node k and node l connected to node k in the heating system, $C_p$ represents a specific heat at constant pressure of fluid in the pipe, $\Phi_k$ represents a heat power supplied or consumed by a heat source or a heat-load node, of node k in the heating system, $L_k$ represents an injection mass flow rate of node k in the heating system, $T_{k,in}$ represents a supply water temperature of node k in the heating system, $T_{k,out}$ represents a return water temperature of node k in the heating system.

5. The method of claim 4, wherein the power flow constraints of the electricity system, is denoted by:

$$P_i = V_i \sum_{j \in i} V_j(G_{ij}\cos\theta_{ij} + B_{ij}\sin\theta_{ij})$$

$$Q_i = V_i \sum_{j \in i} V_j(G_{ij}\sin\theta_{ij} - B_{ij}\cos\theta_{ij}).$$

6. The method of claim 4, wherein the steady-state hydraulic constraints of the pipes of the heating system, is denoted by:

$$h_{pu} = a_0 \cdot m^2 + a_1 \cdot m + a_2$$

$$h_{pi} = K \cdot m \cdot |m|$$

$$h_{va} = \frac{100}{\rho} \cdot \left(\frac{m}{Kv}\right)^2$$

$$h_{ex} = c \cdot \mathrm{Re}^b \cdot \frac{\zeta}{\rho} \cdot m^2$$

$$A \cdot m = m^q$$

$$B \cdot h = 0$$

where, h represents a pressure provided by an element or a pressure of fluid loss when the fluid flows through the element; m represents a mass flow rate of the fluid flowing through the element; the subscript represents a type of element, in which, pu represents a circulating pump, pi represents a pipe, va represents a valve, ex represents a heat exchanger; $a_0$, $a_1$, $a_2$ represent parameters of the circulation pump; K represents a resistance along the pipe of the heating system; Kv represents a parameter of the valve; Re represents a Reynolds number; $\rho$ represents a density of the fluid in the pipe of the heating system; b, c, $\zeta$ represent parameters of the heat exchanger; A represents a node-branch correlation matrix of the heating system; m represents a column vector including a mass flow rate of each branch in the heating system, and $m^q$ represents a column vector including an injection mass flow rate at each node in the heating system; B represents a loop-branch correlation matrix of the heating system; and h represents a column vector including a pressure difference at each node.

7. The method of claim 6, wherein the thermal steady-state constraints of the pipes of the heating system, is denoted by:

$$(\Sigma m_{out})T_{out} = \Sigma(m_{in}T_{in})$$

$$\varphi_{ex,h} = C_p \cdot m_h \cdot (T_{h,in} - T_{h,out})$$

$$\varphi_{ex,c} = C_p \cdot m_c \cdot (T_{c,in} - T_{c,out})$$

$$\varphi_{ex,h} = \varphi_{ex,c}$$

where, $\varphi$ represents an internal energy power; T represents a fluid temperature; subscript out represents an outflow node; subscript in represents an inflow node; subscript h represents a hot-water side of the heat exchanger; subscript c represents a cold-water side of the heat exchanger.

8. The method of claim 4, wherein
constraints of cogeneration units under a case that the combined heat and power system employs gas turbines or reciprocating piston internal combustion engines as the cogeneration units, is denoted by:

$$k_{CHP} = \Phi^{CHP}/P^{CHP}$$

where, $k_{CHP}$ represents a heat and power generation ratio of the cogeneration unit; $\Phi^{CHP}$ represents a heat power generated by the cogeneration unit; and $P^{CHP}$ represents an electric power generated by the cogeneration unit;
constraints of cogeneration units under a case that the combined heat and power system employs steam turbines as the cogeneration units, is denoted by:

$$Z_{CHP} = \frac{\Phi^{CHP} - 0}{P^{Con} - P^{CHP}}$$

where, $Z_{CHP}$ represents a ratio that describes trade-off between heat supplied to site and electric power of the steam turbine; $P^{Con}$ represents a maximum power output of the steam turbine; $\Phi^{CHP}$ represents a heat power produced by the cogeneration unit; $P^{CHP}$ represents an electric power generated by the cogeneration unit.

9. The method of claim 8, wherein the energy transmission delay produced by each pipe in the heating system, is calculated, using the following formula of:

$$s = \gamma \cdot \Delta t - \frac{V^* - SL}{(\hat{m}_{t-\gamma\Delta t}/\rho_{t-\gamma\Delta t})}$$

where, $\hat{m}_{t-\gamma\Delta t}$ represents a fluid mass flow rate in the pipe of the heating system for time $t-\gamma\Delta t$, of which a value obtained in historical steady-state estimation results; $\rho$ represents a fluid density corresponding to a temperature in the steady-state estimation result of the combined heat and power system;

$$\gamma = \min_n \left\{ n : \text{s.t.} \sum_{k=0}^{n} \left(\frac{\hat{m}_{t-k\Delta t}}{\rho_{t-k\Delta t}} \cdot \Delta t\right) \geq SL,\ n \geq 0,\ n \in Z \right\},$$

in which, $$\min_n$$

represents obtaining a minimum value of all eligible n in the system; s. t. represents an abbreviation of subject to, which means subjecting to conditions; $\hat{m}_{t-k\Delta t}$ represents a fluid mass flow rate in the pipe of the heating system for time $t-k\Delta t$, of which a value obtained from historical steady-state state estimating results when k>0 and from a current steady-state state estimation result when k=0; Z represents a set of integers, that is, the smallest positive integer n is found, such that $$\sum_{k=0}^{n} \left(\frac{\hat{m}_{t-k\Delta t}}{\rho_{t-k\Delta t}} \cdot \Delta t\right) \geq SL$$

is established, and n that satisfies the conditions is assigned to $\gamma$; $\Delta t$ represents a sampling interval on the measurements of the combined heat and power system;

$$V^* = \sum_{k=0}^{\gamma} \left(\frac{\hat{m}_{t-k\Delta t}}{\rho_{t-k\Delta t}} \cdot \Delta t\right);$$

S represents a cross-sectional area of the pipe; and L represents a length of the pipe.

10. The method of claim 9, wherein establishing the dynamic constraint of each pipe in the heating system based on the steady-state estimation result and the energy transmission delay, comprises:

obtaining a fluid density and a specific heat at constant pressure at a current state estimation time based on an average temperature of the fluid in the steady-state estimation results by, $$\rho=\rho(\overline{T}), C_p=C_p(\overline{T})$$

where, $\overline{T}$ represents an average temperature of the fluid in a period from time $(t-\gamma\Delta t)$ to time t;

obtaining the dynamic constraint of each pipe in the heating system by:

$$T_{out}(t) = [T_{in}(t-\gamma\Delta t) - T_a] \cdot e^{-\frac{\lambda}{C_p S \rho} \cdot s} + T_a$$

where, $T_{out}(t)$ represents a return water temperature of a pipe at time t; $T_{k,in}(t-\gamma\Delta t)$ represents a supply water temperature of the pipe at time $(t-\gamma\Delta t)$; $T_a$ represents an ambient temperature of the pipe; $\lambda$ represents a heat dissipation coefficient per unit length of the pipe; S represents a cross-sectional area of the pipe; L represents a length of the pipe; and s represents the energy transmission delay, a represents a cycle index.

11. The method of claim 10, wherein determining whether the dynamic-state estimation result is convergent comprises:

determining whether the cycle index a reaches a preset cycle index d; and in response to the cycle index a reaches the preset cycle index d, determining that the dynamic-state estimation result is convergent.

12. The method of claim 11, further comprising:

in response to that the cycle index a does not reach the preset cycle index d, determining whether a difference between state variables $x_a$ and state variables $x_{a-1}$ in two recent neighboring estimation results is less than an accuracy $\delta$; and in response to that the difference between state variables $x_a$ and state variables $x_{a-1}$ in two recent neighboring estimation results is less than the accuracy $\delta$, determining that the dynamic-state estimation result is convergent.

13. The method of claim 12, further comprising:

in response to that the difference between state variables $x_a$ and state variables $x_{a-1}$ in two recent neighboring estimation results is not less than the accuracy $\delta$, determining that the dynamic-state estimation result is not convergent.

* * * * *